Oct. 22, 1929.  S. M. VAUCLAIN  1,733,035
DRIVING WHEEL AND AXLE
Filed May 6, 1929
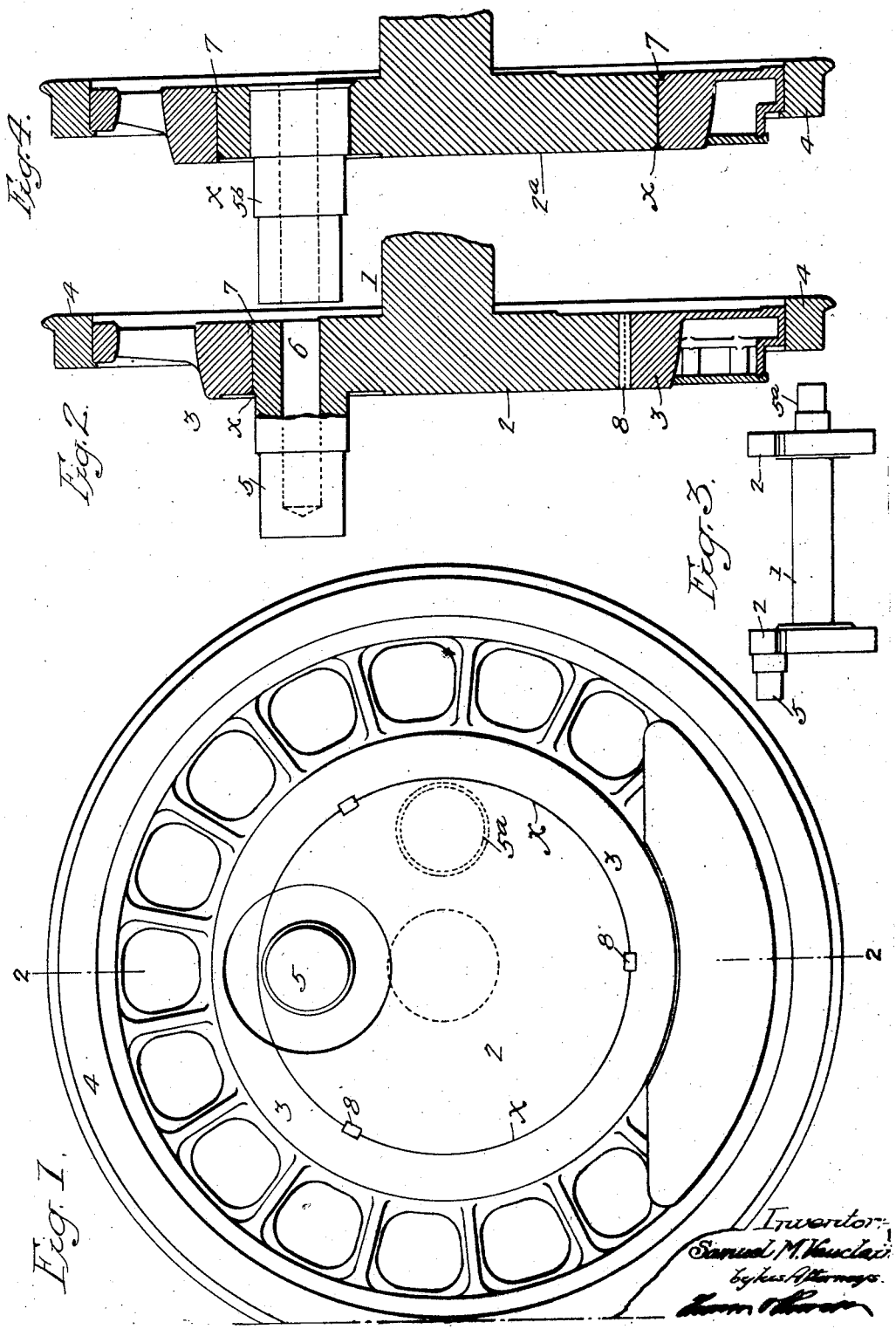

Patented Oct. 22, 1929

1,733,035

UNITED STATES PATENT OFFICE

SAMUEL M. VAUCLAIN, OF ROSEMONT, PENNSYLVANIA

DRIVING WHEEL AND AXLE

Application filed May 6, 1929. Serial No. 360,845.

One object of my invention is to improve the construction of driving wheels of locomotives in order to overcome the difficulty met with when applying large axles and crank pins to locomotives, where the amount of metal left between the respective bores for axles and crank pins is not sufficient to insure a tight fit, thus permitting the axle or crank pin to work loose. Increasing the distance between centres is objectionable as it necessarily increases the stroke.

A further object of the invention is to make the axle disk and wheel fit concentric with each other, insuring ease of machining and a more symmetrical stress in the parts.

In the accompanying drawing:

Fig. 1 is a face view of a locomotive driving wheel made in accordance with my invention;

Fig. 2 is a sectional view on the line 2—2, Fig. 1;

Fig. 3 is a detached side view of the axle and integral disks; and

Fig. 4 is a sectional view illustrating a modification of the invention.

This invention is an improvement upon the constructions illustrated in Patents Nos. 1,642,409 and 1,642,410, dated September 13, 1927.

The disks 2—2 are made integral with the axle 1 and are turned concentric to the axle.

Each disk fits the bore of its wheel centre 3, which bore is concentric with its circumference and with the tire 4.

The crank pins 5 and $5^a$, Fig. 3, are spaced at 90° from each other, and are shown integral with the disks 2, Fig. 2. These pins are bored hollow as at 6, and the axle may be hollow bored if desired. The crank pins may be spaced at any other degrees than 90°, such as 120° for three-cylinder engines.

Each disk has an annular flange 7 at the inner side fitting a recess in the wheel centre. The wheel centre is shrunk upon the disk and may be welded at $x$ if desired. One or more keys 8 may be driven between the disk 2 and the wheel centre 3 as further security against one part turning on the other part.

The construction shown in Fig. 1 shows the crank pin 5 and the axle 1 made integral with the disk so that there is no necessity of increasing the distance between the centre of the crank pin and the centre of the axle.

In Fig. 4 I have illustrated a modification of the invention. In this instance the crank pin $5^b$ is made separate from the disk $2^a$ and pressed into the crank pin opening and riveted over as in the usual practice. The disk $2^a$ is slightly larger in diameter than the disk shown in Fig. 2, on account of the additional metal required outside of the crank pin opening, which insures a tight fit of the crank pin when pressed into position. The disk, however, is concentric with the wheel centre.

I claim:—

1. The combination of an axle having integral disks at each end thereof; wheel centres, the disks being concentric with the axle and with the bore of the wheel centres which are shrunk upon said disks; and a crank pin on each disk.

2. The combination of an axle having an integral disk, the circumference of the disk being concentric with the axle; an integral crank pin projecting from the disk; and a wheel centre shrunk upon the disk.

3. The combination of an axle; a disk made integral with the axle; a wheel centre having a concentric bore, the circumference of the disk being concentric with the axle and with the bore of the wheel centre; a crank pin on the disk, said disk having an annular flange at its inner side fitting an annular recess in the wheel centre; and keys driven between the disk and the wheel centre.

SAMUEL M. VAUCLAIN.